Dec. 10, 1968   W. C. CARMICHAEL   3,415,596
SPECTACLE BRIDGE STRUCTURE WITH INTEGRAL NOSE GRIP AND
REARWARDLY DISPOSED RECESSES
Filed June 28, 1965

INVENTOR.
WALTER C. CARMICHAEL
BY
ATTORNEY

United States Patent Office 3,415,596
Patented Dec. 10, 1968

3,415,596
SPECTACLE BRIDGE STRUCTURE WITH INTEGRAL NOSE GRIP AND REARWARDLY DISPOSED RECESSES
Walter C. Carmichael, West Peabody, Mass., assignor to American Optical Corporation, a corporation of Delaware
Filed June 28, 1965, Ser. No. 467,660
5 Claims. (Cl. 351—131)

ABSTRACT OF THE DISCLOSURE

A spectacle frame comprising a pair of lens receiving rims interconnected by a bridge having an arcuate lower edge. Nasal sides of the rims extend divergently directly from the lower edge of the bridge along generally straight lines as oppositely disposed nose bearing surfaces of the frame. Each of the rims has a rearwardly disposed recess adjacent the lower edge of the bridge for receiving nasal flesh displaced by the nose bearing surfaces. The recesses each extend a substantial distance across the width of its respective rim from the nose bearing surface thereof and into the frame to a maximum depth of less than the thickness of the frame.

---

This invention relates to spectacle frames and has particular reference to improvements in the nose engaging portions thereof.

An object of the present invention is to effectually and successfully cope with problems of fitting ophthalmic mountings, sunglasses and the like.

Another object is to provide more than usual comfort of fit of ophthalmic mountings upon the nose of a wearer.

Another object is to achieve the foregoing in a novel, simple and inexpensive manner without affecting current or foreseeable eyewear styling trends.

Still another object is to provide a unique improvement in the construction of the nasal or bridge portions of spectacle frames which improvement is particularly applicable but not limited to the all-plastic or die-cast all-metal types of eyewear.

To achieve the aforesaid objects and others which may appear from the following description, in accordance with the principles of this invention, I provide a pair of recesses cut or otherwise formed in the rear or face engaging nasal portion of the spectacle frame. These recesses extend into the frame from the back thereof toward its front. They are located one in each of the depending side portions of the bridge section of the frame immediately below the bridge proper and just above the nose bearing pads or equivalent portions of nasal sides of the lens rims.

The recesses are of such depth as to extend a substantial distance into the frame yet not through to the front thereof. Thus, they are concealed when the frame is worn and, accordingly, do not affect or alter its original styling or general appearance. When the frame is in use, however, the recesses provide openings in the frame immediately above the regions of contact which the nose bearing pads or equivalent nasal portions of the frame make with the wearer's nose. These openings allow the flesh of the nose to move freely thereinto when the frame is placed firmly against the nose in a normal position of use.

In providing such openings for receiving the flesh of the nose, the usual skin indentations caused by crowding of the flesh in the regions of contact of the frame with the sides and bridge of the nose are substantially eliminated and, accordingly, the discomfort attending such indentation of the skin and irritation resulting from prolonged wearing of spectacle frames is avoided. Also, the nasal flesh which becomes displaced laterally into the recesses tends to key the frame in place upon the nose and thus minimize any tendency for the frame to slip downwardly along the nose.

The openings provided by the aforementioned recesses, however, are of such magnitude as to not only permit movement of displaced nasal flesh thereinto but, at the same time, they normally accommodate such flesh with sufficient space therearound for ventilation.

The present invention will be better understood by reference to the following detailed description which is accompanied by a drawing in which FIG. 1 depicts, in front elevation, one form of spectacle frame embodying the principles of the present invention;

Figure 1:
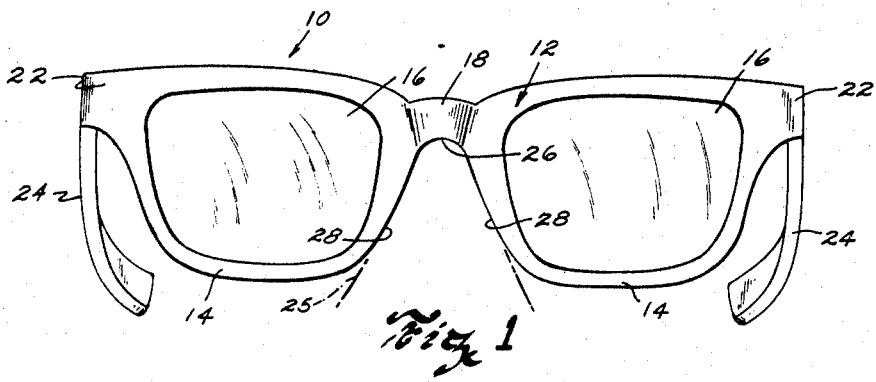

Referring now to FIG. 1, there is shown spectacle frame 10 which is exemplary of a type and styling of eyewear to which the principles of this invention are particularly but not solely applicable.

Frame 10 comprises spectacle front 12 having a pair of spaced internally grooved lens rims 14 each adapted to receive and support a spectacle lens 16. The nasal sides of rims 14 are interconnected by bridge 18. Therebeneath, each rim is provided with a nose bearing pad 20 (see FIGS. 2, 3 and 4). At the opposite temporal sides of rims 14 there are enlarged endpieces 22 (FIG. 1) each having a temple 24 hinged thereto as shown in FIG. 4 for use in holding frame 10 in place before the eyes when it is worn.

Spectacle front 12 may be moulded, blanked and/or milled or otherwise formed of a suitable plastic material or it may be die cast of a light weight metal such as, for example, aluminum, magnesium or an alloy of aluminum and magnesium.

Figure 2:
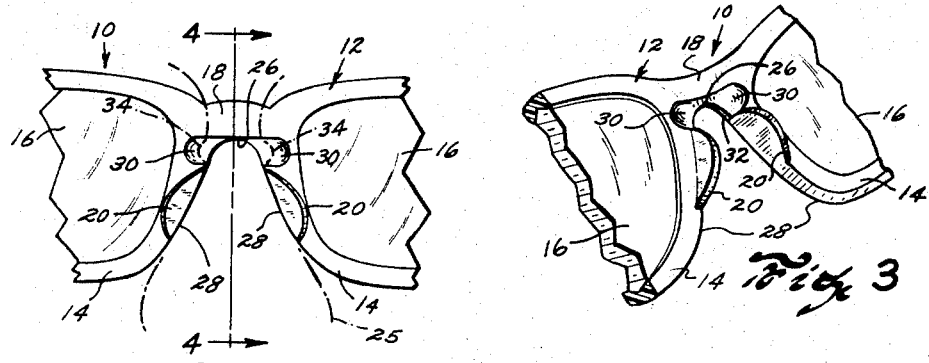
FIG. 2 is a fragmentary rear view of a portion of the spectacle frame shown in FIG. 1.

The nasal region of front 12 is, as shown in FIGS. 1 and 2, contoured to fit closely about the bridge and opposite sides of the nose of a wearer. It has an arcuate upper portion formed by the lower edge 26 of bridge 18 from which nasal sides 28 of rims 14 continue uninterruptedly downwardly and divergently in such manner as to follow along and fit closely against respective opposite sides of the nose. Broken lines in FIGS. 1 and 2 are intended to illustrate the general outline of a typical wearer's nose 25.

The nasal structure of frame 10 which constitutes the portion of frame front 12 including bridge 18 and a length of each rim 14 extending downwardly from bridge 18 at least to a point below the lowermost edge of nose pads 20 is of a type commonly referred to in the art as a "modified saddle bridge."

It is this general type of bridge styling and/or construction to which the present invention is particularly related and involves a unique improvement in the construction of the rearward nasal portion of frame front 12 which affords a user thereof with greater than usual wearing comfort. At the same time, this important benefit is achieved without alteration of the forwardly disposed portion of the frame so that the pleasing appearance of the "saddle bridge" styling as viewed from the front of frame 10 is preserved.

Figure 3:
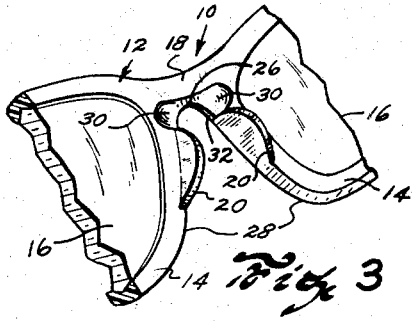
FIG. 3 illustrates the same embodiment of the invention in perspective for greater comprehension thereof.
Figure 4:
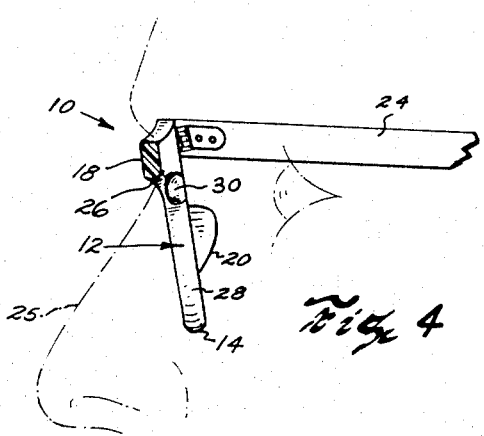
FIG. 4 is a cross-sectional view of the spectacle frame taken along line 4—4 of FIG. 2.

Referring more particularly to FIGS. 2–4, it will be seen that, according to one aspect of my invention, a pair of recesses 30 are formed, one in each of lens rims 14, at one side of edge 26 of bridge 18 and directly above the adjacent nose pad 20.

In this embodiment of the invention, the rearwardly facing recesses 30 are generally spherically concave and extend into rims 14 to a point of maximum depth adjacent the nasal sides of rims 14. As can be seen in FIG. 3, a thickness 32 of material is allowed to remain forwardly of frame front 12 to preserve the already described "saddle" shape of the frame's nasal section.

Recesses 30 extend laterally from nasal sides 28 of rims 14 thereacross to a point adjacent but not through the grooved inner sides of said rims. Thus, recesses 30 each provide an open area in frame front 12 between bridge 18 and pads 20 into which the flesh of a wearer's nose can move freely to prevent, as already mentioned, the usual crowding and indentation thereof in the general areas of contact which pads 20 and edge 26 of bridge 18 make with the nose. The movement of nasal flesh into recesses 30 which also tends to key the frame 10 in place on the nose is illustrated in FIG. 2 by portions 34 of the dot-dash outline of nose 25. Portions 34 represent exemplary amounts of nasal flesh being displaced from adjacent portions of nose 25 into recesses 30. It can also be seen in FIG. 2 that recesses 30 are intended to be of such magnitude as to provide space around the nasal flesh which is accommodated therein for ventilation of that particular region of the nose.

Recessses 30 can be moulded or cast directly in frame front 12 during the initial operation of forming the same or, in the case of frames which are blanked and/or milled from plastic sheet stock, for example, these recesses can be simply and economically cut thereinto with a suitable milling tool or other form of cutter.

Figure 5:
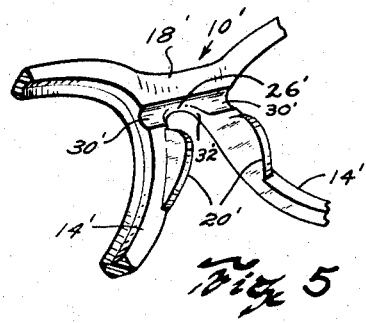
FIG. 5 is a fragmentary rear perspective view of a modification of the invention.

A modification of the invention is illustrated in FIG. 5. In this embodiment, recesses 30' between bridge 18' and nose pads 20' comprise cylindrical channels which are moulded, cut or otherwise formed to extend transversely completely across lens rims 14' adjacent edge 26' of bridge 18'. Recesses 30' are of a depth controlled to allow a substantial thickness 32' of the material of frame 10' to remain forwardly thereof which thickness is more than adequate for maintaining the integrity of rims 14' during normal use of the spectacle frame. Thus, in keeping with the general concept of the invention, recesses 30' provide openings in frame 10' above nose pad 20' into which flesh of the nose is accommodated during use of the frame.

Those skilled in the art will readily appreciate that various modifications of the precise form of the invention here shown may be made to suit particularly requirements. Thus, the illustrated and described embodiments of the invention are not to be interpreted as restrictive thereof beyond that necessitated by the following claims.

I claim:

1. A spectacle frame comprising a pair of lens receiving rims, a bridge interconnecting said rims adjacent respective nasal sides thereof and a temple extending rearwardly from the opposite temporal side of each of said rims for holding said frame in a position of use upon the face of a wearer, said bridge having an arcuate lower edge adapted to fit over and rest upon the bridge of a wearer's nose, said nasal sides of said rims being extended from respective opposite sides of said lower edge of said bridge divergently along generally straight lines so as to follow and fit as nose bearing surfaces closely against respective opposite sides of said nose, said rims each having a recess disposed rearwardly of said frame adjacent said arcuate lower edge of said bridge for receiving nasal flesh displaced by said bridge and said nose bearing surfaces, said recesses each extending a substantial distance into said frame toward the front side thereof to a maximum depth less than the thickness of the frame and each being of a length such as to extend from said nasal sides of said rims across at least a substantial portion of the width of said rims.

2. A spectacle frame as recited in claim 1 wherein the recesses extend from said nasal sides of said rims only partially thereacross.

3. A spectacle frame as recited in claim 1 wherein the recesses extend from said nasal sides of said rims completely across said widths thereof.

4. A spectacle frame as recited in claim 1 wherein the recesses are generally spherically concave.

5. A spectacle frame as recited in claim 1 wherein the recesses are cylindrically concave.

References Cited
UNITED STATES PATENTS

| | | | |
|---|---|---|---|
| 2,270,330 | 1/1942 | Nerney | 351—87 |
| 2,561,403 | 7/1951 | Nelson. | |
| D. 103,297 | 2/1937 | Barrett | D57—6 |

DAVID SCHONBERG, *Primary Examiner.*

J. W. LEONARD, *Assistant Examiner.*

U.S. Cl. X.R.

2—14